US012585610B2

(12) United States Patent
Xu et al.

(10) Patent No.: US 12,585,610 B2
(45) Date of Patent: Mar. 24, 2026

(54) COMPUTING SYSTEM, PCI DEVICE MANAGER AND INITIALIZATION METHOD THEREOF

(71) Applicant: Hangzhou AliCloud Feitian Information Technology Co., Ltd., Hangzhou City (CN)

(72) Inventors: Jiexiong Xu, Hangzhou City (CN); Yijing Wang, Hangzhou City (CN); Xin Yuan, Hangzhou City (CN)

(73) Assignee: Hangzhou AliCloud Feitian Information Technology Co., Ltd., Hangzhou City (CN)

( * ) Notice: Subject to any disclaimer, the term of this patent is extended or adjusted under 35 U.S.C. 154(b) by 0 days.

(21) Appl. No.: 18/685,223

(22) PCT Filed: Jan. 28, 2023

(86) PCT No.: PCT/CN2023/073541
§ 371 (c)(1),
(2) Date: Feb. 20, 2024

(87) PCT Pub. No.: WO2023/143504
PCT Pub. Date: Aug. 3, 2023

(65) Prior Publication Data
US 2025/0123986 A1     Apr. 17, 2025

(30) Foreign Application Priority Data
Jan. 29, 2022     (CN) .......................... 202210111761.9

(51) Int. Cl.
| | | |
|---|---|---|
| *G06F 13/42* | (2006.01) | |
| *G06F 13/16* | (2006.01) | |
| *G06F 13/40* | (2006.01) | |

(52) U.S. Cl.
CPC ...... *G06F 13/4221* (2013.01); *G06F 13/1642* (2013.01); *G06F 13/404* (2013.01)

(58) Field of Classification Search
None
See application file for complete search history.

(56) References Cited

U.S. PATENT DOCUMENTS

| | | | | | |
|---|---|---|---|---|---|
| 9,672,148 B1 * | 6/2017 | Michaud | ............ | G06F 12/0868 |
| 9,882,984 B2 * | 1/2018 | Chiu | ................... | H04L 67/1097 |

(Continued)

FOREIGN PATENT DOCUMENTS

| | | |
|---|---|---|
| CN | 1193393 A | 9/1998 |
| CN | 102981892 A | 3/2013 |

(Continued)

OTHER PUBLICATIONS

China National Intellectual Property Adminstration; International Search Report and Written Opinion issued in PCT App. No. PCT/CN2023/073541 dated Apr. 26, 2023; 13 pages.

(Continued)

*Primary Examiner* — Farley Abad
*Assistant Examiner* — Dayton Lewis-Taylor
(74) *Attorney, Agent, or Firm* — Maschoff Brennan

(57) ABSTRACT

The present disclosure relates to a computing system, a PCI device manager and an initialization method thereof. The PCI device manager is used to realize peer-to-peer data transmission between PCI devices, and the PCI device manager includes: a DMA engine module that realizes data and command communication with a host and a PCI device through DMA; a device memory; a memory mapping module that maps a data cache space of the device memory to a physical address space of the host memory, so as to perform data communication and/or command communication with the PCI device via the DMA engine module in a running (Continued)

process; and a processor that sends a PCI device configuration instruction to the host through the DMA engine module, and creates PCI device objects respectively for PCI devices discovered by the host.

20 Claims, 5 Drawing Sheets

(56)                    References Cited

U.S. PATENT DOCUMENTS

| | | |
|---|---|---|
| 2007/0294444 A1 | 12/2007 | Panesar |
| 2010/0077117 A1 | 3/2010 | Asnaashari |
| 2014/0317219 A1 | 10/2014 | Fitch et al. |
| 2015/0026368 A1 | 1/2015 | Kagan et al. |
| 2019/0220413 A1* | 7/2019 | Vakharwala ........ G06F 12/1036 |

FOREIGN PATENT DOCUMENTS

| | | |
|---|---|---|
| CN | 103678201 A | 3/2014 |
| CN | 103885900 A | 6/2014 |
| CN | 105068953 A | 11/2015 |
| CN | 105159742 A | 12/2015 |
| CN | 107992436 A | 5/2018 |
| CN | 109710548 A | 5/2019 |
| CN | 111133425 A | 5/2020 |
| CN | 112416826 A | 2/2021 |
| CN | 112463714 A | 3/2021 |
| CN | 112925737 A | 6/2021 |
| CN | 113296691 A | 8/2021 |
| CN | 114138702 A | 3/2022 |

OTHER PUBLICATIONS

China National Intellectual Property Adminstration; Office Action issued in CN App. No. 202210111761.9 dated Jan. 29, 2022.

China National Intellectual Property Adminstration; Notice of Allowance issued in CN App. No. 202210111761.9 dated Apr. 26, 2022; 5 pages.

Zhao Shanshan; "Design of PCIE high-speed data transmission system"; Computer Knowledge and Technology; Issue 4; Feb. 28, 2017.

Wang Yuanqiang et al.; "High-speed Asynchronous Transmission System Based on FPGA PCLe Bus"; NARI Group Corporation, State Grid Electric Power Research Institute; Aug. 2018; 4 pages.

Sun Fengxia et al.; "Design and Implementation of PCIe on UM-BUS test system"; Computer Technology and Its Applications; vol. 45, Issue 5; 2019; DOI: 10.16157/j.ISSN.0258-7998.190034; 5 pages.

* cited by examiner

Computing device 500

Memory 510

Processor 520

FIG. 5

COMPUTING SYSTEM, PCI DEVICE MANAGER AND INITIALIZATION METHOD THEREOF

CROSS-REFERENCE TO RELATED APPLICATIONS

This application is a National Stage of International Application No. PCT/CN2023/073541, filed on Jan. 28, 2023, which claims priority to Chinese Patent Application No. 202210111761.9, filed to China National Intellectual Property Administration on Jan. 29, 2022 and entitled "COMPUTING SYSTEM, PCI DEVICE MANAGER AND INITIALIZATION METHOD THEREOF", both of which are hereby incorporated by reference in their entireties.

TECHNICAL FIELD

The present disclosure relates to Peer-to-Peer (P2P) direct communication technology between PCI (peripheral component interconnect) devices.

BACKGROUND

In recent years, with the near failure of Moore's Law, the growth of CPU's single-core processing capacity has encountered a bottleneck.

At the same time, the performance of IO (input/output, mainly related to reading and writing a memory in the present disclosure) devices presents an exponential growth trend. For example, the IOPS (input/output operations per second) of an existing PCIe (PCI Express, peripheral component interconnect express) device with NVMe (NVM Express, non-volatile memory express) specification has increased from 800K to 1500K, which is about a double performance improvement. In contrast, the processing capacity of a CPU single-core is about 1000K. In the long run, there will be fewer and fewer external devices that the CPU single-core can serve.

At the same time, large-scale data also consumes a lot of memory resources of the host side. This brings a great challenge to the server architecture of the data center.

Therefore, the PCIe P2P technology, which enables direct communication between IO devices, has attracted wide attention in industry and academia.

Through P2P technology, a device can communicate directly with other devices without the participation of a CPU and a memory of the host side. In this way, the utilization rate of the CPU and the memory of the host side can be reduced, and the asymmetry between the growth rate of CPU performance and the growth rate of IO performance can be alleviated.

At present, there are some solutions in the industry that use PCIe P2P technology to reduce the overhead of IO data transmission on the CPU side, shorten the path of the IO data transmission and improve the performance of the IO data transmission. For example, some existing network interface controllers can support NoF (NVMe over Fabric, NVMe-based network storage protocol) scenario, and the storage data received by a network interface controller is directly transmitted by P2P to an SSD of a host without participation of CPU of the host side, which does not occupy any CPU resources of the host side, thus greatly reducing the overhead of the CPU.

However, this kind of solution needs to customize to the NVMe driver and network interface controller driver of the host side, the host side still needs to load and run the drivers of two devices running P2P, and its code needs to be customized to support P2P data transmission, which lakes of universality. At the same time, although the solution avoids the processing of data transmission in the host, it still needs to occupy the memory resources and bandwidth of the host, which affects the memory performance of the application on the host.

Therefore, an improved peer-to peer (P2P) direct communication solution between PCI devices is still needed.

SUMMARY

A technical problem to be solved by the present disclosure is to provide an improved peer-to-peer (P2P) direct communication solution between PCI devices, which can further reduce occupation and dependence on a host CPU and memory resources.

According to a first aspect of the present disclosure, a PCI device manager is provided, which is used to realize peer-to-peer data transmission between PCI devices and includes: a direct memory access (DMA) engine module, connected to a host bus to realize data and command communication with a host and the PCI devices through DMA: a device memory; a memory mapping module that maps a data cache space of the device memory to a physical address space of a host memory, for example, in an initialization process, so as to perform data communication and/or command communication with the PCI devices via the DMA engine module in a running process: a processor, which, for example, in an initialization process, sends a PCI device configuration instruction to the host through the DMA engine module, and creates PCI device objects respectively for PCI devices discovered by the host through, for example, a PCI enumeration operation, so as to realize data communication and/or command communication with the PCI devices discovered by the host through the PCI device objects in the running process.

In an implementation, creating PCI device objects respectively for the discovered PCI devices includes: configuring data cache spaces respectively for the discovered PCI devices in the device memory; and registering corresponding queues respectively for the discovered PCI devices in the device memory.

In an implementation, for a PCI device requesting access to data, the queues include a work queue, and the processor reads from the work queue a data access command written by the PCI device corresponding to the work queue; and/or the queues include a completion queue, and the processor informs the PCI device that the command execution is completed by writing a completion queue element into the completion queue registered for the PCI device in the device memory.

In an implementation, for a PCI device storing data, the queues include a work queue, and the processor writes a data access command into the work queue registered for the PCI device in the device memory; and/or the queues include a work queue, and the processor informs the PCI device to read the data access command from the work queue registered for the PCI device in the device memory by writing a notification message into a doorbell register of the PCI device; and/or the queues include a completion queue, and the PCI device informs the PCI device manager that the command execution is completed by writing a completion queue element into the completion queue registered for the PCI device in the device memory.

In an implementation, the data access command specifies a data cache address to be used in this data access operation in the device memory.

In an implementation, when a first PCI device requests to read data stored on a second PCI device, a first reading command for the second PCI device is written by the first PCI device into the first work queue registered for the first PCI device in the device memory, and the first reading command includes information of data requested to be read and a specified data cache address in the device memory: the first reading command is converted into a second reading command corresponding to the second PCI device by the processor, and the second reading command includes the information of the data requested to be read and the specified data cache address in the device memory: the second reading command is written into the second work queue registered for the second PCI device in the device memory: a notification message is written into a doorbell register of the second PCI device through the DMA engine module to inform the second PCI device to read the second reading command from the second work queue: the data requested to be read is written into a specified data cache area corresponding to the specified data cache address by the second PCI device in response to the notification message; and in response to completion of a data sending operation of the second PCI device, a notification message is written into a doorbell register of the first PCI device through the DMA engine module to inform the first PCI device to read the data from the specified data cache area.

In an implementation, when a first PCI device requests to write data into a second PCI device, a first writing command for the second PCI device is written by the first PCI device into a first work queue registered for the first PCI device in the device memory, and the first writing command includes a specified data cache address in the device memory: data is written into the specified data cache address in the device memory by the first PCI device: the first writing command is converted into a second writing command corresponding to the second PCI device by the processor, and the second writing command includes the specified data cache address in the device memory: the second writing command is written into a second work queue registered for the second PCI device in the device memory: a notification message is written into a doorbell register of the second PCI device through the DMA engine module to inform the second PCI device to read the second writing command from the second work queue.

In an implementation, the first PCI device is a network interface controller and the second PCI device is a solid state disk.

According to a second aspect of the present disclosure, a computing system is provided, which includes: a host, where the host includes a host memory, a host CPU and a host bus: multiple PCI devices, connected to the host bus; and the PCI device manager according to the first aspect above, connected to the host bus, where data and command communication between multiple PCI devices is implemented through the PCI device manager.

According to a third aspect of the present disclosure, an initialization method of a PCI device manager is provided, which is suitable for being performed on the host CPU of the computing system according to the second aspect above, the method includes: registering the device memory in the PCI device manager into a physical address space of the host memory through a PCI base address register space of the host: receiving a PCI device configuration instruction sent by a program running on the processor of the PCI device manager: performing a PCI device enumeration instruction to discover PCI devices connected to the host bus: sending information of the discovered PCI devices to the PCI device manager; and issuing the PCI device configuration instruction to the discovered PCI devices.

According to a fourth aspect of the present disclosure, an initialization method of a PCI device manager is provided, which is suitable for being performed on the processor of the PCI device manager of the computing system according to the second aspect above, the method includes: sending a PCI device configuration instruction to the host, and creating PCI device objects respectively for discovered PCI devices based on information of the PCI devices discovered through, for example, a PCI enumeration operation returned from the host, so as to realize data communication and/or command communication with the PCI devices through the PCI device objects in a running process.

According to a fifth aspect of the present disclosure, a computing device is provided, which includes: a processor; and a memory storing an executable code thereon, where the executable code, when executed by the processor, causes the processor to perform the method as described in the third or fourth aspect above.

According to a sixth aspect of the present disclosure, a computer program product is provided, including an executable code, where the executable code, when executed by a processor of an electronic device, causes the processor perform the method as described in the third or fourth aspect above.

According to a seventh aspect of the present disclosure, a non-transitory machine-readable storage medium is provided, storing an executable code thereon, where the executable code, when executed by a processor of an electronic device, causes the processor perform the method as described in the third or fourth aspect above.

Therefore, when data transmission is performed between PCI devices, the expensive CPU and memory resources of the host can be released, and meanwhile, the data transmission performance between PCI devices can be improved.

BRIEF DESCRIPTION OF DRAWINGS

The above and other objects, features and advantages of the present disclosure will become more apparent by describing exemplary implementations of the present disclosure in more detail in conjunction with the accompanying drawings, in which same reference signs generally represent same components in the exemplary implementations of the present disclosure.

FIG. 5 shows a schematic structural diagram of a computing device that can be used to implement a method of the present disclosure according to an embodiment of the present disclosure.

DESCRIPTION OF EMBODIMENTS

Figure 1:
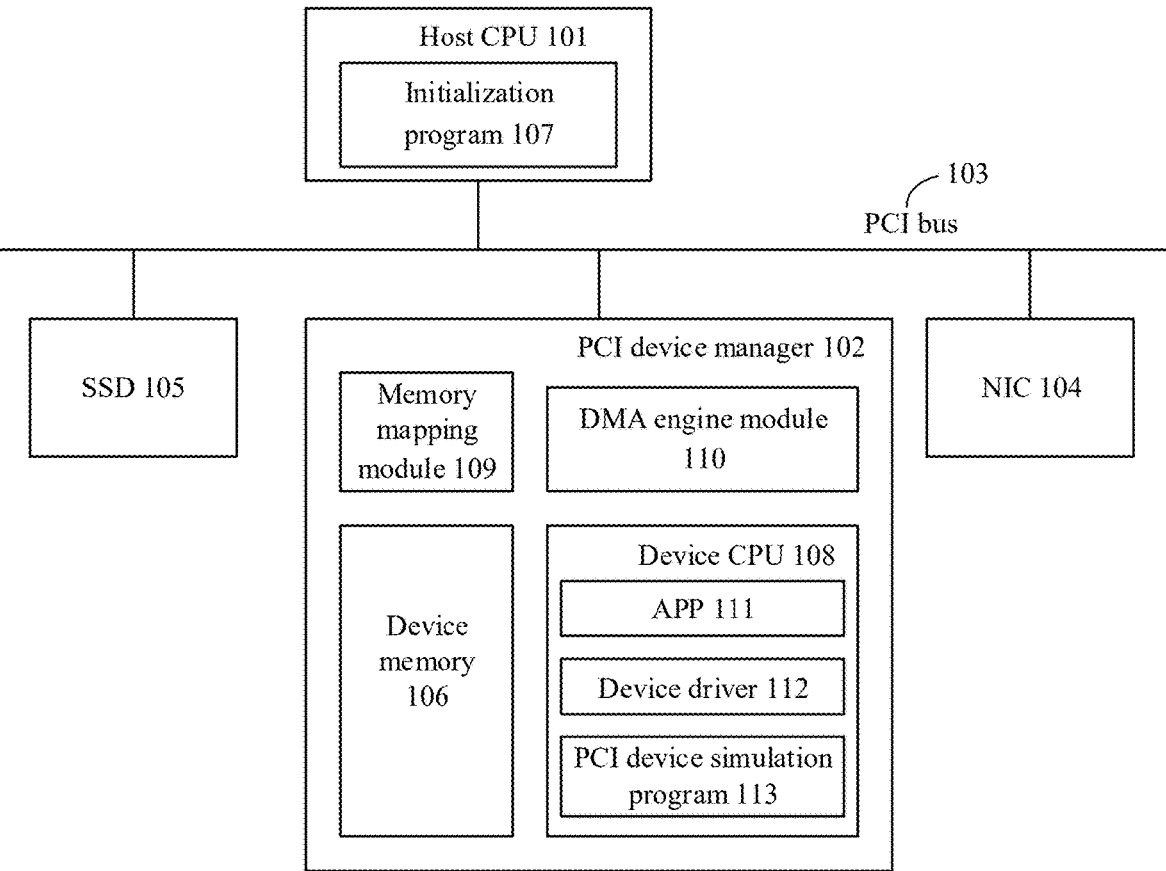
FIG. 1 shows a schematic structural block diagram of a computing system according to the present disclosure.

Preferable implementations of the present disclosure will be described in more detail below with reference to the accompanying drawings. Although preferred implementations of the present disclosure are shown in the drawings, it should be understood that the present disclosure may be implemented in various forms and should not be limited by the implementations described here. In contrast, these implementations are provided to make the present disclosure more thorough and complete, and to completely convey the scope of the present disclosure to those skilled in the art.

The inventor of the present disclosure proposes to add a dedicated PCI device manager in a computing system, where the dedicated PCI device has a memory and a CPU used to manage and realize peer-to-peer (P2P) data transmission between PCI devices in the computing system.

Therefore, the present disclosure proposes a method for realizing P2P data transmission between general PCI devices. Various PCI devices (such as a network interface controller, SSD) on the host are managed by using a dedicated PCI device manager, other PCI devices are enumerated by using an agent program (an initialization program) of the host side, so that any PCI device can be enumerated and initialized by the PCI device manager, thus realizing the purpose of P2P data transmission between a PCI device manager and a host PCI device. According to the P2P architecture between general PCI devices of the present disclosure, support for the P2P architecture can be realized only by newly inserting a PCI device manager into the server and without modifying a host driver of a P2P device. The dedicated PCI device manager contains a P2P direct memory access (DMA) engine and a memory mapping mechanism between a host and the device manager, which can easily realize the P2P transmission between the PCI device manager and other PCI devices. Therefore, the expensive CPU and memory resources of a server can be completely released, and meanwhile, the data transmission performance between devices can be improved.

Only for the purpose of distinguishing from the memory and CPU on the host, in the context of the present disclosure, the memory and the CPU on the PCI device manager are called "device memory" and "device CPU" respectively. The term "device" is only used to distinguish, and is not used to limit the properties of memory or CPU itself.

In addition, in the embodiments of the present disclosure, a description is given by taking setting a CPU on the PCI device manager to execute a corresponding program as an example. It should be understood that the device CPU may also be replaced by various other processors or controllers as long as the corresponding program can be run.

It should be understood that the solution of the present disclosure may be applied to various PCI devices including a PCIe device.

The physical form of the PCI device manager itself may also be a PCI (or PCIe) device, which may be formed based on, for example, a FPGA (field programmable gate array) and an embedded ARM (advanced RISC (reduced instruction set computer) machine) system on chip (SoC). The PCI device manager may contain a customized hardware and a general CPU module, and can be plugged into a standard PCIe slot of the host.

The PCI device manager and other PCIe devices that need to perform P2P communication are located on the PCIe bus of the host, which are independent of each other and have no other physical coupling and connection.

By using the device memory and the device CPU on the PCI device manager to replace the host memory and the host CPU, the P2P data transmission between PCI devices is realized, and the occupation of the host memory and the host CPU is reduced.

FIG. 1 shows a schematic structural diagram of a computing system according to the present disclosure.

As shown in FIG. 1, the computing system includes a host CPU 101, PCI devices and a PCI device manager 102. The host CPU 101, the PCI devices and the PCI device manager 102 are all connected to the PCI bus 103.

The PCI devices shown in FIG. 1 include a network interface controller (NIC) 104 and a solid state disk (SSD) 105. It should be understood that PCI devices that may be included in the computing system are not limited to these.

The network interface controller (NIC) 104 is also called as "network card component", which is mainly responsible for sending data to a remote end or receiving data from a remote end. When receiving data, the network interface controller will unpack and parse a data packet received from the remote end, and save the parsed data in the device memory 106 of the PCI device manager 102. When sending data, the network interface controller will read data from the device memory of the PCI device manager, and package the data into a data packet according to a network transmission protocol and send it to the remote end.

A solid state disk (SSD) 105 may be, for example, an NVMe (NVM Express, non-volatile memory express) SSD component, which is responsible for storing data. When reading or writing data, the PCI device manager 102 saves an NVMe command to an NVMe queue of the device memory 106 of the PCI device manager 102, and informs the SSD to fetch data by writing a doorbell register of the NVMe SSD. The NVMe SSD will fetch the NVMe command from the device memory 106 of the PCI device manager 102.

When writing data to the SSD, the NVMe SSD will read and store, according to the NVMe command, data from an indicated address where the data is cached in the device memory. When reading data from the SSD, the NVMe SSD will write, according to the NVMe command, data saved in the SSD to be read into an indicated device memory address.

An initialization program 107 of the PCI device manager 102 can be run on the CPU of the host. The initialization program can be responsible for registering the device memory of the PCI device manager into a physical address space of the host memory, establishing communication with a PCI simulation program of the device manager, receiving an initialization command from the device manager, issuing a related command and returning a related result.

As shown in FIG. 1, the PCI device manager 102 may include a device memory 106, a device CPU 108, a memory mapping module 109 and a DMA engine module 110.

The DMA engine module 110 is connected to a host bus to realize data and command communication with a host and a PCI device through DMA.

The DMA engine module may be a programmable DMA engine module. It may be used by a PCI simulation program running on the device CPU 108 of the PCI device manager 102, and may be used to access the PCI device base address register (BAR) space and the host memory of the host side, to realize the configuration and use of the host and other PCI devices by the PCI device manager. The BAR is a number of registers in PCI configuration space, such as 6 registers from 0×10 to 0×24, which are used to define information such as a size of a configuration space required by a PCI device and an address space occupied by a PCI device, etc.

The device CPU 108 is responsible for executing an application (APP) 111, a device driver 112 and a PCI device simulation program 113 on the device manager.

In an initialization process, the memory mapping module 109 maps a data cache space of the device memory 106 to a physical address space of the host memory, so as to perform data communication and/or command communication with a PCI device via the DMA engine module 110 in a running process.

The memory mapping module 109 may be realized by a physical function (PF)/virtual function (VF) module of the PCI device manager 102. The device manager and the host can access each other's physical address space of a memory through the PCI base address register (BAR) space, and the device memory of the device manager is mapped to the physical memory address space of the host, which is equivalent to realizing the routing of accessing the device memory.

In addition, in the initialization process, the device CPU 108 sends a PCI device configuration instruction to the host through the DMA engine module 110, and creates PCI device objects respectively for PCI devices discovered by the host through, for example, a PCI enumeration operation, so as to realize data communication and/or command communication with the PCI devices through the PCI device objects in a running process. It should be understood that the host can discover PCI devices connected to the host bus by various methods, which is not limited to performing the PCI enumeration operation.

The PCI device objects are bases for loading an upper network and drivers of PCI devices such as an NVMe.

Here, creating the PCI device objects may at least include the following two aspects.

In one aspect, data cache spaces are configured respectively for the discovered PCI devices in the device memory. During the subsequent running process, the PCI devices can access the data cache spaces configured for them.

In another aspect, corresponding queues are registered respectively for the discovered PCI devices in the device memory.

The queues may include a Work Queue (WQ) and a Completion Queue (CQ). The work queue is used to write a command that needs to be transmitted, and the completion queue is used to write a Completion Queue Element (CQE) indicating that the command execution is completed.

For example, when the PCI device is a network interface controller (NIC), the work queue may include a Send Queue (SQ) and a Receive Queue (RQ). The NIC writes a corresponding reading or writing command (SQE/RQE) into the SQ or the RQ, and the PCI device manager writes the CQE into the CQ.

For another example, when the PCI device is a solid state disk (SSD), the work queue may include a Submission Queue (SQ). The PCI device manager writes a reading or writing command into the SQ, and the SSD writes the CQE to the CQ.

Next, an initialization process of the PCI device manager of the present disclosure and the solution of realizing peer-to-peer communication between PCI devices by using the PCI device manager are further described.

Figure 2:
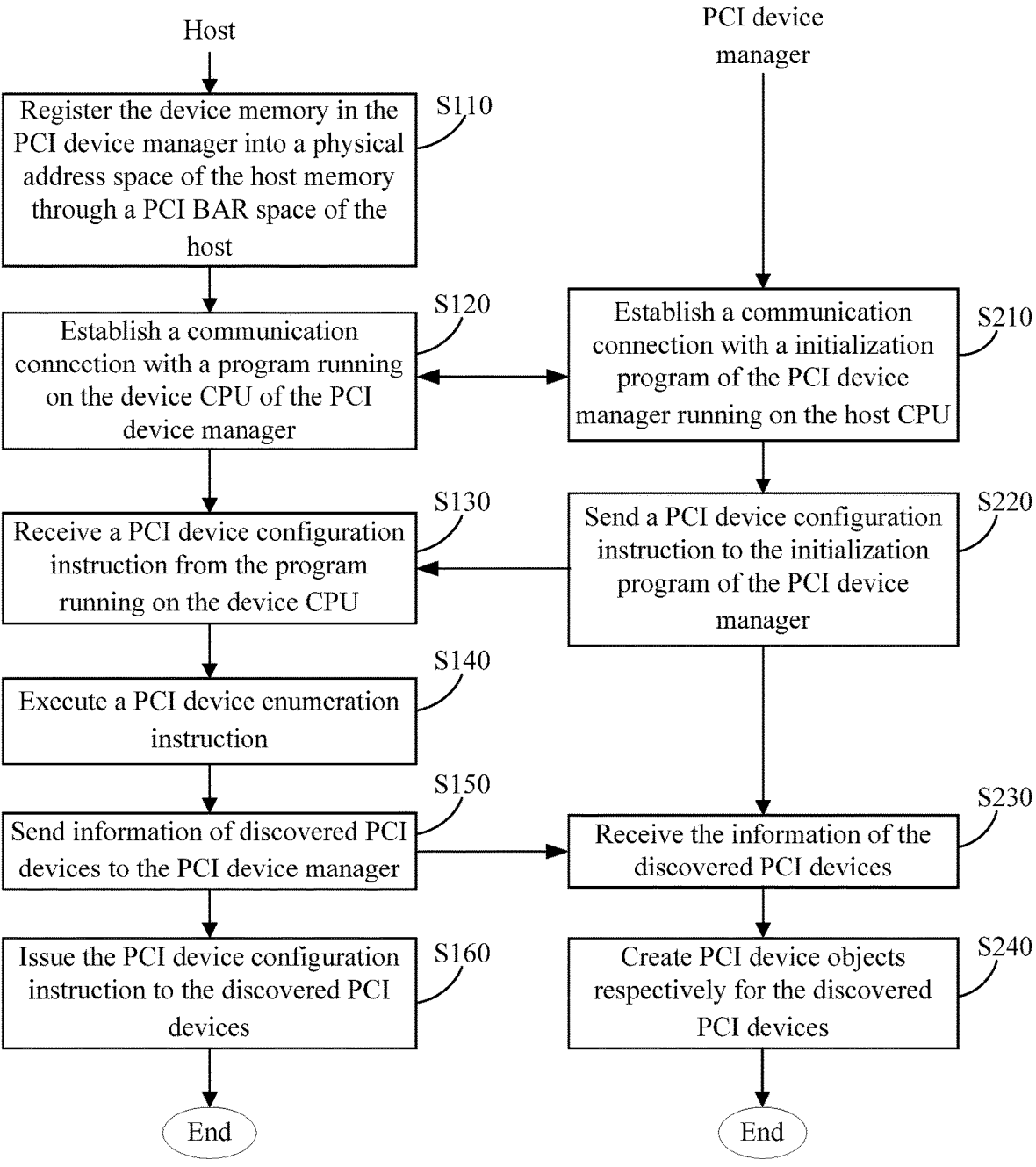
FIG. 2 shows a schematic flowchart of an initialization method of a PCI device manager according to the present disclosure.

FIG. 2 shows a schematic flowchart of an initialization method of the PCI device manager according to the present disclosure.

The initialization process of the PCI device manager is completed collectively by an initialization program of the PCI device manager running on the host CPU (hereinafter referred to as "host side program") and a program running on the device CPU of the PCI device (hereinafter referred to as "manager side program"). After the initialization process is completed, there is no need to use the host CPU in the running process of realizing peer-to-peer communication between PCI devices by using the PCI device manager.

First, in step S110, the host side registers the device memory in the PCI device manager into a physical address space of the host memory through a PCI base address register space of the host. First, the device memory of the device manager is registered into the physical address space of the host memory.

Then, in step S120 of the host side and in step S210 of the manager side, a communication connection is established between the host side program and the device side program. The device side program here may be, for example, a PCI device simulation program. The enumeration process and the configuration process described below are equivalent to the PCI device simulation process.

After the connection is established, the PCI device simulation program of the PCI device manager will perform a PCI enumeration operation, and issue a PCI device configuration instruction which may include, for example, a PCI device enumeration instruction.

In step S220, the manager program sends a PCI device configuration instruction to the host program.

In step S130, the host program receives the PCI device configuration instruction from the manager program.

Accordingly, in step S140, the host program executes the PCI device enumeration instruction to discover PCI devices connected to the host bus.

Then, in step S150, the host program sends information of discovered PCI devices to the manager program.

In step S160, the host program issues the PCI device configuration instruction to the discovered PCI devices.

In step S230, the manager program receives the information of the discovered PCI devices.

In step S240, the manager program creates PCI device objects respectively for the discovered PCI devices based on the information of the discovered PCI devices, so as to realize data communication and/or command communication with the PCI devices through the PCI device objects in the running process.

As described above, creating PCI device objects may at least include two aspects: in the device memory, configuring data cache spaces and registering corresponding queues, respectively for the discovered PCI devices.

Here, the operation of creating PCT device objects may be performed, for example, by a device driver running in the device CPU of the PCI device manager.

For example, the device driver may register queues of PCI devices such as an NVMe SSD and a NIC, into the device memory of the device manager.

After the above operations are completed, the initialization process of the system is completed.

Therefore, in the P2P data transmission solution of the present disclosure, by using the host side program to execute the PCI device enumeration instruction, any PCI device connected on the bus can be enumerated and initialized (configured), so that P2P data transmission between the PCI device manager and the host PCI device can be realized.

Next, a data and command communication method between the PCI device manager and other PCI devices after completing the initialization of the PCI device manager and a solution of data transmission between PIC devices through the PCI device manager are described.

A PCI device may be a device that requests access to data stored on other PCI devices, such as a network interface controller (NIC), or may be a device that stores data and is accessed by other PCI devices.

For a PCI device requesting access to data, the PCI device will write a data access command into the work queue registered for the PCI device in the device memory. The device CPU of the PCI device manager reads the written data access command from the work queue. The data access command may specify a data cache address to be used in this data access operation in the device memory.

Accordingly, after the data access operation is completed, the device CPU informs the PCI device that the command execution is completed by writing a completion queue element (CQE) in the completion queue registered for the PCI device in the device memory.

For the PCI device storing data, such as a solid state disk (SSD), when there is a data access command for the PCI device, the device CPU writes a data access command into the work queue registered for the PCI device in the device memory. Similarly, the data access command may specify a data cache address to be used in this data access operation in the device memory.

The device CPU informs the PCI device to read the data access command from the work queue registered for the PCI device in the device memory by writing a notification message into a doorbell register of the PCI device.

The PCI device informs the PCI device manager the completion of command execution by writing a completion queue element into the completion queue registered for the PCI device in the device memory.

As described above, in the transmission solution between the PCI devices of the present disclosure, in the initialization process, the device driver in the PCI device manager registers the queues of PCI devices, such as the NVMe SSD and the network interface controller, into the device memory of the device manager. At the same time, the device memory is exposed to the host through the PCI BAR space, so that PCI devices can access the device memory through the DMA engine module.

Therefore, in the running process, it can be realized that both the data transmission and the command transmission can bypass the host CPU and the host memory 324 (shown in FIG. 3 and FIG. 4) in the IO process.

The device CPU in the PCI device manager informs related devices a request to fetch the queue in the device memory by writing the doorbell register of PCI devices, such as an NVMe SSD and a network interface controller, through the PCI BAR.

Figure 3:
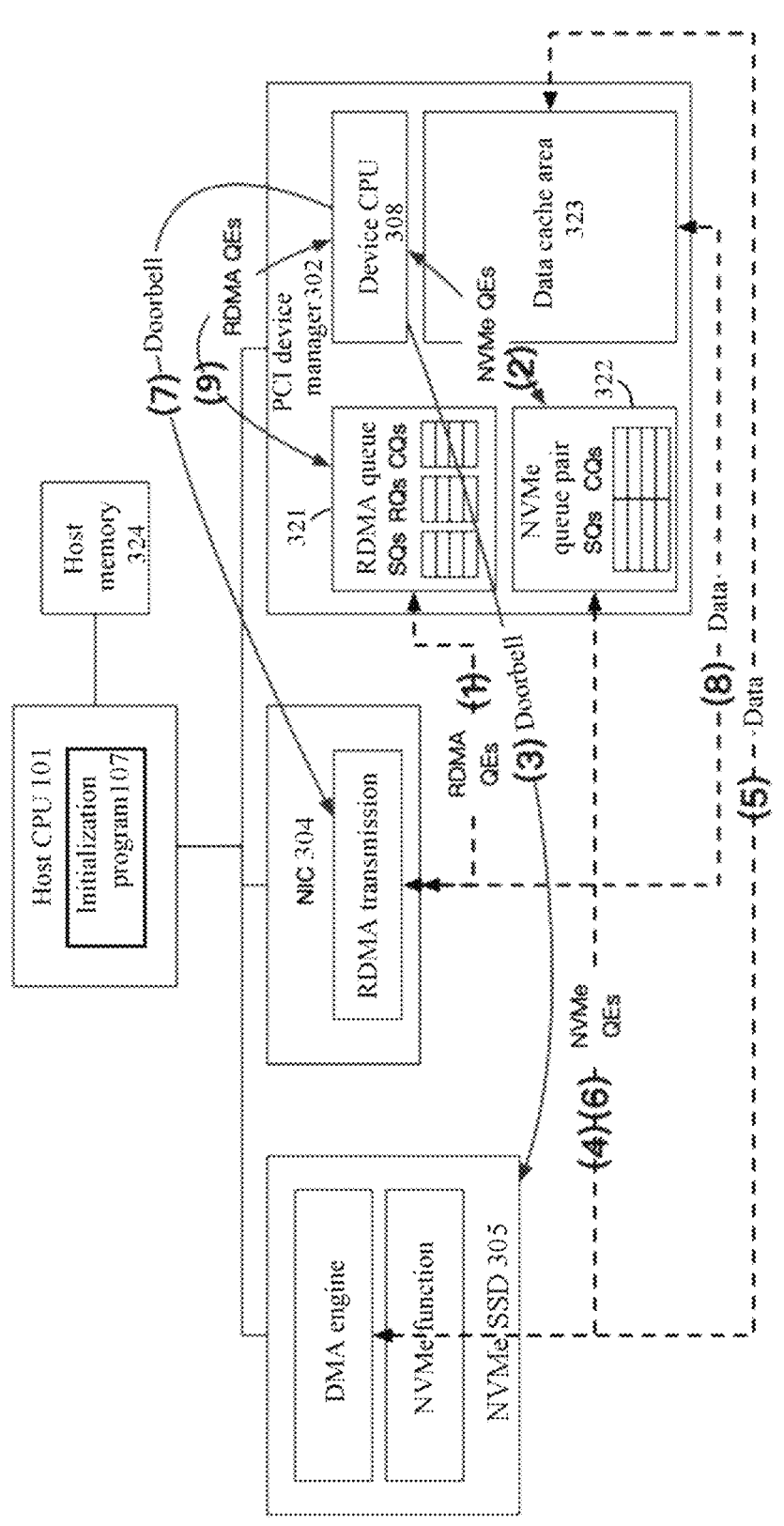
FIG. 3 shows a schematic diagram of a data and command flow when a first PCI device such as a network interface controller (NIC) requests to read data stored on a second PCI device such as a solid state disk (SSD).
Figure 4:
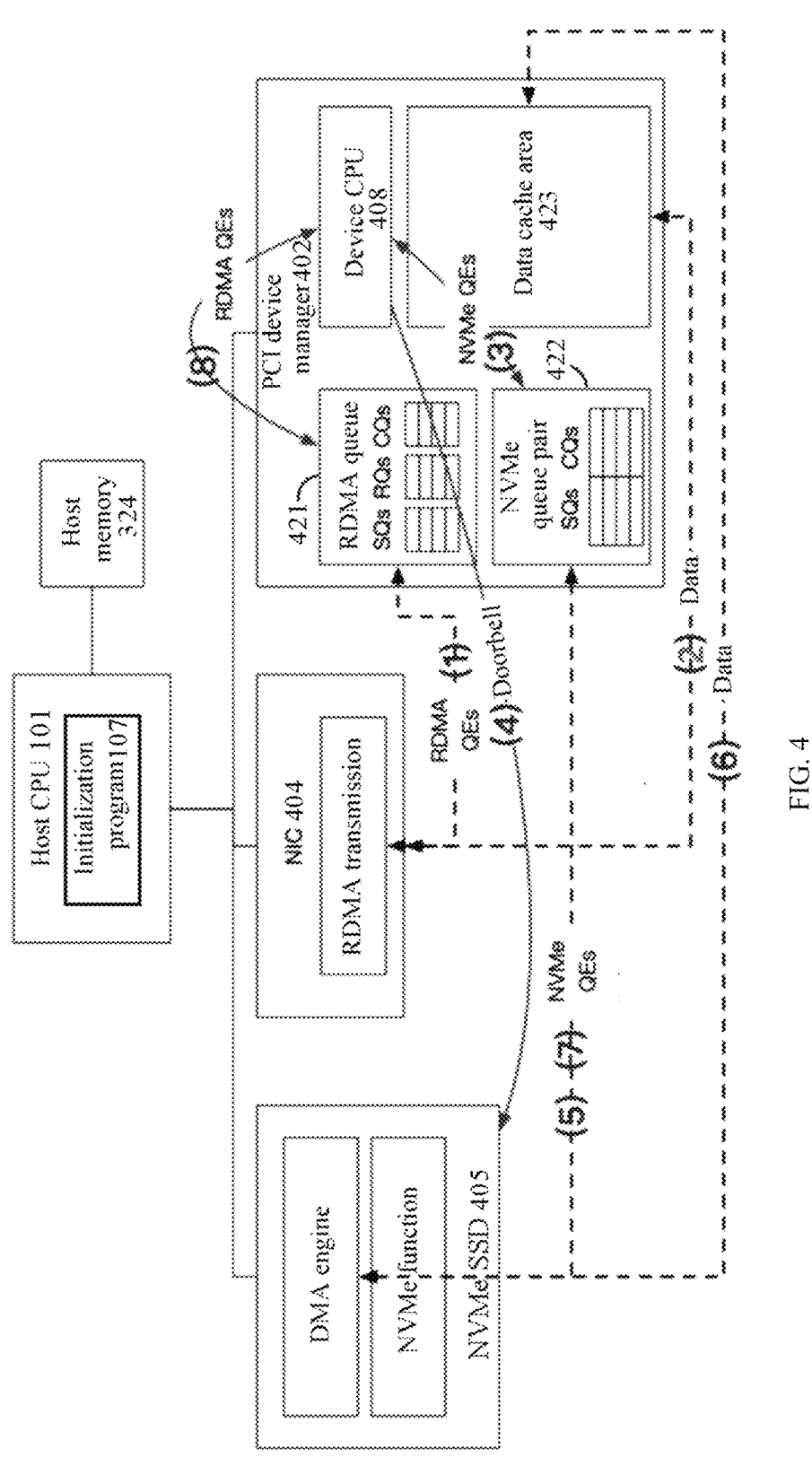
FIG. 4 shows a schematic diagram of a data and command flow when a first PCI device such as a network interface controller (NIC) requests to write data into a second PCI device such as a solid state disk (SSD).

Reference is made to FIG. 3 and FIG. 4, the solution of data transmission between two PCI devices through the PCI device manager will be described below. Taking the case that the first PCI device is a network interface controller (NIC) that supports remote direct memory access (RDMA) and the second PCI device is an NVMe solid state drive (SSD) as an example to describe the scenario of NoF (NVMe based network storage protocol) remote storage access.

After the above initialization process is completed, the PCI device manager can see the network interface controller (NIC) and the solid state disk (SSD). PCI device manager normally loads the NVMe driver to complete initialization, and creates an NVMe queue in the device memory. The PCI device manager starts the NoF service, which creates an NoF queue for the network interface controller (NIC).

FIG. 3 shows a schematic diagram of a data and command flow when a first PCI device such as a network interface controller (NIC) 304 requests to read data stored on a second PCI device such as a non-volatile memory express (NVMe)

solid state disk (SSD) 305. The numbers (step numbers) in parentheses indicate the order of the data and command flow.

In the case that a user of a remote end initiates a data reading request, the NIC 304 receives a data reading command from the NoF, then the NIC 304 requests to read the data stored on the NVMe SSD 305.

As shown in FIG. 3, in step 1, the NIC 304 writes a first reading command for the NVMe SSD 305 into a first work queue (RQ queue of RDMA queue 321) registered for the NIC 304 in the device memory by P2P communication through, for example, the DRM engine module. The first reading command may include information of data requested to be read and a specified data cache address in the device memory.

The NoF service in the device CPU 308, for example, parses the first reading command (NoF reading command), and converts the first reading command into a second reading command (NVMe command) corresponding to the NVMe SSD 305. The second reading command includes the information of the data requested to be read and the specified data cache address in the device memory.

Then, in step 2, the device CPU 308 writes the second reading command into a second work queue (SQ queue of NVMe queue pair 322) registered for the NVMe SSD 305 in the device memory.

In step 3, the device CPU 308 writes a notification message into the doorbell register of the NVMe SSD 305 through the DMA engine module to inform the NVMe SSD 305 to read the second reading command (NVMe command) from the second work queue (SQ queue of the NVMe queue pair 322) in the device memory.

In step 4, the NVMe SSD 305 reads the second reading command (NVMe reading command) from the second work queue (SQ queue of the NVMe queue pair 322) in response to the notification message written into the doorbell register.

In step 5, the NVMe SSD 305 writes the data requested to be read into a specified data cache area 323 corresponding to the specified data cache address in response to the notification message.

In step 6, after the data sending operation is completed, the NVMe SSD 305 writes CQE into the CQ queue of the NVMe queue pair 322 in the device memory, indicating that the command execution is completed.

In step 7, in response to knowing, through the CQE, that the SSD data sending operation is completed, a notification message is written into the doorbell register of the NIC 304 though the DMA engine module to inform the NIC 304 to read data from the specified data cache area 323, so as to initiate an RDMA (remote direct data access) request to send data to the remote end.

In step 8, the NIC 304 reads the data from the specified data cache area 323 in the device memory.

After the data transmission is completed, in step 9, the device CPU 308 writes the CQE into the CQ queue of the first queue, so that the NoF service in the PCI device manager 302 sends the CQE of the NVMe to the remote end through the RDMA to inform the remote end that the data reading request is completed.

FIG. 4 shows a schematic diagram of a data and command flow when a network interface controller (NIC) 404 requests to write data into a SSD such as a non-volatile memory express (NVMe) solid state disk (SSD) 405. The numbers (step numbers) in parentheses indicate the order of the data and command flow.

In the case that a user of a remote end initiates a data write request, the NIC 404 receives a data writing command from the NoF, then the NIC 404 requests to write data into the NVMe SSD 405.

In step 1, the NIC 404 writes a first writing command (NoF writing command) for the NVMe SSD 405 into the first work queue (SQ queue of the RDMA queue 421) registered for the NIC 404 in the device memory, and the first writing command includes a specified data cache address in the device memory.

In step 2, the data sent by the NIC 404 is cached at the specified data cache address in the device memory.

The device CPU 408 converts the first writing command into a second writing command (NVMe writing command) corresponding to the NVMe SSD 405, the second writing command includes the specified data cache address in the device memory, and in step 3, the second writing command is written into the second work queue (SQ queue of the NVMe queue pair 422) registered for the NVMe SSD 405 in the device memory.

In step 4, the device CPU 408 writes a notification message into the doorbell register of the NVMe SSD 405 through the DMA engine module to inform the NVMe SSD 405 to read the second writing command from the second work queue.

In step 5, the NVMe SSD 405 reads the second writing command from the second work queue (SQ queue of the NVMe queue pair 422) in response to the notification message in the doorbell register.

In step 6, the NVMe SSD 405 reads data from the specified data cache address of the data cache area 423 and stores the data.

In step 7, after the operation of NVMe SSD 405 storing data is completed, the NVMe SSD 405 writes a CQE in the CQ queue of the NVMe queue pair 422 in the device memory, indicating that the command execution is completed.

In step 8, the device CPU 408 writes the CQE into the CQ queue of the first queue, so that the NoF service in the PCI device manager 402 sends the CQE of the NVMe to the remote end through the RDMA to inform the remote end that the data writing request is completed.

So far, the present disclosure has proposed a method for realizing a general P2P architecture. Through the initialization program of the PCI device manager and the host, P2P data transmission between PCIe devices is realized without modifying the standard PCI device driver running on the host and the device manager, and a general P2P architecture is realized.

Through the method of using the PCI device simulation program on the PCI device manager and using the initialization program on the host side, the enumeration and access to the host side PCI device through the PCI device manager are realized.

Through the PCI device manager, this general software and hardware platform, the P2P data transmission between the PCI device manager and all other PCI devices can be realized without modifying the PCI device driver, which greatly simplifies the difficulty of P2P implementation and non-invasive support in production environment.

The present disclosure proposes a method for realizing a general P2P architecture by inserting a dedicated hardware (PCI device manager) into the PCI bus slot of the host system and installing related software modules. Hardware modules include a device CPU, a DMA engine module, a memory mapping module and a device memory. The software modules include a host side initialization program and the program running in the hardware module. The host side initialization program will expose the device memory of the hardware module to the host during the initialization process, and through the initialization program, the PCI devices that need to perform P2P can be enumerated and accessed by the device manager, so that the PCI device manager can directly realize P2P data transmission with other PCI devices on the host side without modifying the target P2P device driver of the host side. The program in the hardware module is responsible for data transmission between all devices. The data transmission process completely bypasses the CPU and the memory of the host side, and is compatible with all kinds of PCI devices, thus a general P2P architecture is realized.

Through the initialization program running on the CPU of the host and the programmable DMA engine, it is realized that the PCI device manager can directly access a configuration space and a BAR space of other PCI devices, so that without modifying the device driver of the host side, it is possible to access other PCI devices through the P2P method, and the whole process completely bypasses the CPU and memory resources of the host side, which well solves the problem of occupying the CPU and memory resources of the host side in the existing P2P communication solution.

Due to the flexibility of the dedicated hardware deployment, the solution proposed by the present disclosure does not need to make other modifications to the existing server hardware architecture, which avoids the problem that the existing P2P communication solution needs to modify the server network.

At the same time, due to the method of PCI device simulation (enumeration), the standard PCI device driver can be used to operate devices in the PCI device manager, which avoids the problem of poor universality caused by the need to develop a dedicated driver for each PCI device.

Figure 5:
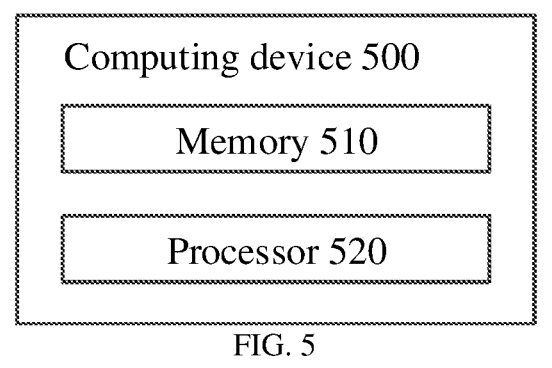

FIG. 5 shows a schematic structural diagram of a computing device that can be used to implement the initialization method of the PCI device manager and the P2P data transmission method between PCI devices according to an embodiment of the present disclosure.

Reference is made to FIG. 5, the computing device 500 includes a memory 510 and a processor 520.

The processor 520 may be a multi-core processor or may include multiple processors. In some embodiments, the processor 520 may contain a general main processor and one or more special coprocessors, such as a graphics processor (GPU), a digital signal processor (DSP). In some embodiments, the processor 520 may be implemented by using a customized circuit, such as an Application Specific Integrated Circuit (ASIC) or a Field Programmable Gate Arrays (FPGA).

The memory 510 may include various types of storage units, such as a system memory, a read-only memory (ROM), and a permanent storage device. The ROM can store static data or instructions needed by the processor 520 or other modules of the computer. The permanent storage device may be a readable and writable storage device. The permanent storage device may be a nonvolatile storage device that will not lose the stored instructions and data even if the computer is powered off. In some implementations, the permanent storage device adopts a mass storage device (e.g., a magnetic or optical disk, a flash memory) as the permanent storage device. In some other implementations, the permanent storage device may be a removable storage device (e.g., a floppy disk, an optical drive). The system memory may be a readable and writable storage device or a volatile readable and writable storage device, such as a dynamic random access memory. The system memory can store instructions and data needed by some or all processors during runtime. In addition, the memory 510 may include a combination of any computer-readable storage mediums, including various types of semiconductor memory chips (DRAM, static random access memory (SRAM), synchronous dynamic random access memory (SDRAM), flash memory, programmable read-only memory), and a magnetic disk and/or an optical disk may also be used. In some implementations, the memory 510 may include a removable storage device that can be read and/or written, such as a compact disk (CD), a read-only digital versatile disk (e.g. a DVD-ROM, a dual-layer DVD-ROM), a read-only blu-ray disk, an ultra-density disk, a flash card (e.g. a SD card, a min SD card, a Micro-SD card), a magnetic floppy disk. The computer-readable storage medium does not contain carrier waves and instantaneous electronic signals transmitted by wireless or wired.

The memory 510 stores an executable code thereon, when the executable code is processed by the processor 520, it can cause the processor 520 to perform the initialization method of the PCI device manager and the method for realizing P2P data transmission between PCI devices as described above.

The PCI device manager and the method for realizing P2P data transmission between PCI devices according to the present disclosure have been described in detail above with reference to the drawings.

In addition, the method according to the present disclosure may also be implemented as a computer program or a computer program product, and the computer program or the computer program product includes computer program code instructions for performing the above steps defined in the above method of the present disclosure.

Alternatively, the present disclosure may also be implemented as a non-transitory machine-readable storage medium (or a computer-readable storage medium, or a machine-readable storage medium), on which an executable code (or a computer program, or a computer instruction code) is stored, and when the executable code (or the computer program, or the computer instruction code) is executed by a processor of an electronic device (or a computing device, a server, etc.), the processor is caused to perform various steps of the above method according to the present disclosure.

It will also be understood by those skilled in the art that the various illustrative logical blocks, modules, circuits, and algorithm steps described in connection with the disclosure herein may be implemented as an electronic hardware, computer software, or a combination of both.

The flowchart and the block diagram in the drawings show the architecture, functions and operations of possible implementations of the system and the method according to multiple embodiments of the present disclosure. In this regard, each block in the flowchart or the block diagram may represent a module, a program segment or a part of code, and the module, the program segment or the part of code contains one or more executable instructions for implementing a specified logical function. It should also be noted that in some alternative implementations, the functions marked in the blocks may occur in a different order than those marked in the drawings. For example, two consecutive blocks may actually be executed substantially in parallel, and they may sometimes be executed in a reverse order, which depends on the function involved. It should also be noted that each block in the block diagram and/or the flowchart, and a combination of blocks in the block diagram and/or the flowchart, may be implemented by a dedicated hardware-based system that performs a specified functions or operation, or may be implemented by a combination of a dedicated hardware and computer instructions.

Embodiments of the present disclosure have been described above, and the above description is illustrative, not exhaustive, and is not limited to the disclosed embodiments. Many modifications and changes will be obvious to those skilled in the art without departing from the scope and spirit of the illustrated embodiments. The terms used herein are chosen to best explain the principles of various embodiments, a practical application or an improvement of technology in the market, or to enable other ordinary people in the technical field to understand various embodiments disclosed herein.

The invention claimed is:

1. A peripheral component interconnect (PCI) device manager, used to realize peer-to-peer data transmission between PCI devices, the PCI device manager comprising:
   a direct memory access (DMA) engine module connected to a host bus to realize data and command communication with a host and the PCI devices through DMA;
   a device memory;
   a memory mapping module that maps a data cache space of the device memory to a physical address space of a host memory, so as to perform data communication and/or command communication with the PCI devices via the DMA engine module in a running process; and
   a processor that sends a PCI device configuration instruction to the host through the DMA engine module, and creates PCI device objects respectively for PCI devices discovered by the host, so as to realize data communication and/or command communication with the PCI devices discovered by the host through the PCI device objects in the running process.

2. The PCI device manager according to claim 1, wherein creating the PCI device objects respectively for the discovered PCI devices comprises:
   configuring data cache spaces respectively for the discovered PCI devices in the device memory; and
   registering queues respectively for the discovered PCI devices in the device memory.

3. The PCI device manager according to claim 2, wherein for a PCI device requesting access to data,
   the queues comprise a work queue, wherein the processor reads from the work queue a data access command written by the PCI device corresponding to the work queue; and/or
   the queues comprise a completion queue, wherein the processor informs the PCI device that the command execution is completed by writing a completion queue element into the completion queue registered for the PCI device in the device memory.

4. The PCI device manager according to claim 3, wherein the data access command specifies a data cache address to be used in this data access operation in the device memory.

5. The PCI device manager according to claim 2, wherein for a PCI device storing data,
   the queues comprise a work queue, wherein the processor writes a data access command into the work queue registered for the PCI device in the device memory; and/or
   the queues comprise a work queue, wherein the processor informs the PCI device to read the data access command from the work queue registered for the PCI device in the device memory by writing a notification message into a doorbell register of the PCI device; and/or the queues comprise a completion queue, wherein the PCI device informs the PCI device manager that the command execution is completed by writing a completion queue element into the completion queue registered for the PCI device in the device memory.

6. The PCI device manager according to claim 5, wherein the data access command specifies a data cache address to be used in this data access operation in the device memory.

7. The PCI device manager according to claim 2, wherein when a first PCI device requests to read data stored on a second PCI device, a first reading command for the second PCI device is written by the first PCI device into a first work queue registered for the first PCI device in the device memory, and the first reading command comprises information of data requested to be read and a specified data cache address in the device memory;

the first reading command is converted into a second reading command corresponding to the second PCI device by the processor, and the second reading command comprises the information of the data requested to be read and the specified data cache address in the device memory;

the second reading command is written into a second work queue registered for the second PCI device in the device memory;

a notification message is written into a doorbell register of the second PCI device through the DMA engine module to inform the second PCI device to read the second reading command from the second work queue;

the data requested to be read is written into a specified data cache area corresponding to the specified data cache address by the second PCI device in response to the notification message; and in response to completion of a data sending operation of the second PCI device, a notification message is written into a doorbell register of the first PCI device through the DMA engine module to inform the first PCI device to read the data from the specified data cache area.

8. The PCI device manager according to claim 6, wherein the first PCI device is a network interface controller and the second PCI device is a solid state disk.

9. The PCI device manager according to claim 2, wherein when a first PCI device requests to write data into a second PCI device, a first writing command for the second PCI device is written by the first PCI device into a first work queue registered for the first PCI device in the device memory, and the first writing command comprises a specified data cache address in the device memory;

data is written into the specified data cache address in the device memory by the first PCI device;

the first writing command is converted into a second writing command corresponding to the second PCI device by the processor, and the second writing command comprises the specified data cache address in the device memory;

the second writing command is written into a second work queue registered for the second PCI device in the device memory; and a notification message is written into a doorbell register of the second PCI device by the DMA engine module to inform the second PCI device to read the second writing command from the second work queue.

10. The PCI device manager according to claim 9, wherein the first PCI device is a network interface controller and the second PCI device is a solid state disk.

11. A computing system, comprising:

a host, wherein the host comprises a host memory, a host central processing unit (CPU) and a host bus;

multiple peripheral component interconnect (PCI) devices, connected to the host bus; and a PCI device manager, connected to the host bus and used to realize peer-to-peer data transmission between the multiple PCI devices, comprising: a direct memory access (DMA) engine module connected to the host bus to realize data and command communication with the host and the multiple PCI devices through DMA; a device memory; a memory mapping module that maps a data cache space of the device memory to a physical address space of the host memory, so as to perform data communication and/or command communication with the multiple PCI devices via the DMA engine module in a running process; and a processor that sends a PCI device configuration instruction to the host through the DMA engine module and creates PCI device objects respectively for PCI devices discovered by the host, so as to realize data communication and/or command communication with the PCI devices through the PCI device objects in the running process;

wherein data and command communication between the multiple PCI devices is implemented through the PCI device manager.

12. An initialization method of the peripheral component interconnect (PCI) device manager of the computing system according to claim 11, which is suitable for being performed on the host central processing unit (CPU) of the computing system, wherein the method comprises:

registering the device memory in the PCI device manager into a physical address space of the host memory through a PCI base address register space of the host;

receiving a PCI device configuration instruction sent by a program running on the processor of the PCI device manager;

performing a PCI device enumeration instruction to discover PCI devices connected to the host bus;

sending information of the discovered PCI devices to the PCI device manager; and issuing the PCI device configuration instruction to the discovered PCI devices.

13. A non-transitory machine-readable storage medium having an executable code stored thereon, wherein the executable code, when executed by a processor of an electronic device, causes the processor to perform the method according to claim 12.

14. An initialization method of the peripheral component interconnect (PCI) device manager of the computing system according to claim 11, which is suitable for being performed on the processor of the PCI device manager of the computing system, wherein the method comprises:

sending a PCI device configuration instruction to the host; and creating PCI device objects respectively for discovered PCI devices based on information of the PCI devices discovered by the host returned from the host, so as to realize data communication and/or command communication with the PCI devices through the PCI device objects in a running process.

15. A non-transitory machine-readable storage medium having an executable code stored thereon, wherein the executable code, when executed by a processor of an electronic device, causes the processor to perform the method according to claim 14.

16. The computing system according to claim 11, wherein creating the PCI device objects respectively for the discovered PCI devices comprises:

configuring data cache spaces respectively for the discovered PCI devices in the device memory; and registering queues respectively for the discovered PCI devices in the device memory.

17. The computing system according to claim 16, wherein for a PCI device requesting access to data, the queues comprise a work queue, wherein the processor reads from the work queue a data access command written by the PCI device corresponding to the work queue; and/or the queues comprise a completion queue, wherein the processor informs the PCI device that the command execution is completed by writing a completion queue element into the completion queue registered for the PCI device in the device memory.

18. The computing system according to claim 16, wherein for a PCI device storing data, the queues comprise a work queue, wherein the processor writes a data access command into the work queue registered for the PCI device in the device memory; and/or the queues comprise a work queue, wherein the processor informs the PCI device to read the data access command from the work queue registered for the PCI device in the device memory by writing a notification message into a doorbell register of the PCI device; and/or the queues comprise a completion queue, wherein the PCI device informs the PCI device manager that the command execution is completed by writing a completion queue element into the completion queue registered for the PCI device in the device memory.

19. The computing system according to claim 16, wherein when a first PCI device requests to read data stored on a second PCI device, a first reading command for the second PCI device is written by the first PCI device into a first work queue registered for the first PCI device in the device memory, and the first reading command comprises information of data requested to be read and a specified data cache address in the device memory;

the first reading command is converted into a second reading command corresponding to the second PCI device by the processor, and the second reading command comprises the information of the data requested to be read and the specified data cache address in the device memory;

the second reading command is written into a second work queue registered for the second PCI device in the device memory;

a notification message is written into a doorbell register of the second PCI device through the DMA engine module to inform the second PCI device to read the second reading command from the second work queue;

the data requested to be read is written into a specified data cache area corresponding to the specified data cache address by the second PCI device in response to the notification message; and in response to completion of a data sending operation of the second PCI device, a notification message is written into a doorbell register of the first PCI device through the DMA engine module to inform the first PCI device to read the data from the specified data cache area.

20. The computing system according to claim 16, wherein when a first PCI device requests to write data into a second PCI device, a first writing command for the second PCI device is written by the first PCI device into a first work queue registered for the first PCI device in the device memory, and the first writing command comprises a specified data cache address in the device memory;

data is written into the specified data cache address in the device memory by the first PCI device;

the first writing command is converted into a second writing command corresponding to the second PCI device by the processor, and the second writing command comprises the specified data cache address in the device memory;

the second writing command is written into a second work queue registered for the second PCI device in the device memory; and a notification message is written into a doorbell register of the second PCI device by the DMA engine module to inform the second PCI device to read the second writing command from the second work queue.

* * * * *